United States Patent
Kapoor et al.

(10) Patent No.: US 8,325,999 B2
(45) Date of Patent: Dec. 4, 2012

(54) ASSISTED FACE RECOGNITION TAGGING

(75) Inventors: Ashish Kapoor, Kirkland, WA (US);
Gang Hua, Kirkland, WA (US); Amir Akbarzadeh, Bellevue, WA (US);
Simon J. Baker, Medina, WA (US)

(73) Assignee: Microsoft Corporation, Redmond, WA (US)

(*) Notice: Subject to any disclaimer, the term of this patent is extended or adjusted under 35 U.S.C. 154(b) by 687 days.

(21) Appl. No.: 12/479,879

(22) Filed: Jun. 8, 2009

(65) Prior Publication Data
US 2010/0310134 A1 Dec. 9, 2010

(51) Int. Cl.
*G06K 9/00* (2006.01)

(52) U.S. Cl. .................. 382/118; 382/224; 382/229

(58) Field of Classification Search .................. None
See application file for complete search history.

(56) References Cited

U.S. PATENT DOCUMENTS

| | | | |
|---|---|---|---|
| 5,940,049 A | 8/1999 | Hinman et al. | |
| 6,327,048 B1 | 12/2001 | Wen | |
| 6,678,389 B1 | 1/2004 | Sun et al. | |
| 6,819,797 B1 | 11/2004 | Smith et al. | |
| 6,847,731 B1 | 1/2005 | Caulfield | |
| 7,103,214 B2 | 9/2006 | Kusakabe et al. | |
| 7,103,225 B2 | 9/2006 | Yang et al. | |
| 7,119,814 B2 | 10/2006 | Meron et al. | |
| 7,130,454 B1 | 10/2006 | Berube et al. | |
| 7,146,349 B2 | 12/2006 | Benitez-Jimenez et al. | |
| 7,162,085 B2 | 1/2007 | Kato et al. | |
| 7,177,463 B2 | 2/2007 | Kusakabe et al. | |
| 7,203,346 B2 | 4/2007 | Kim et al. | |
| 7,274,822 B2 | 9/2007 | Zhang et al. | |
| 8,014,572 B2 | 9/2011 | Xiao et al. | |
| 2002/0122596 A1* | 9/2002 | Bradshaw | 382/226 |
| 2002/0159642 A1 | 10/2002 | Whitney | |
| 2003/0048950 A1 | 3/2003 | Savakis et al. | |
| 2003/0059107 A1 | 3/2003 | Sun et al. | |
| 2003/0175844 A1 | 9/2003 | Lotti et al. | |
| 2004/0001621 A1 | 1/2004 | Kusakabe et al. | |
| 2004/0064455 A1 | 4/2004 | Rosenzweig et al. | |
| 2004/0264780 A1* | 12/2004 | Zhang et al. | 382/224 |
| 2006/0061595 A1 | 3/2006 | Goede et al. | |
| 2006/0239515 A1 | 10/2006 | Zhang et al. | |
| 2007/0239683 A1* | 10/2007 | Gallagher | 707/3 |
| 2008/0235724 A1 | 9/2008 | Sassenscheidt et al. | |

(Continued)

FOREIGN PATENT DOCUMENTS

WO WO0016243 3/2000

OTHER PUBLICATIONS

Yuandong Tian, We Liu, Rong Xiao, Fang Wen, and Xiaoou Tang, "A Face Annotation Framework with Partial Clustering and Interactive Labeling", 2007, IEEE.*

(Continued)

*Primary Examiner* — Andrew W Johns
*Assistant Examiner* — Siamak Harandi (57) ABSTRACT

The described implementations relate to assisted face recognition tagging of digital images, and specifically to context-driven assisted face recognition tagging. In one case, context-driven assisted face recognition tagging (CDAFRT) tools can access face images associated with a photo gallery. The CDAFRT tools can perform context-driven face recognition to identify individual face images at a specified probability. In such a configuration, the probability that the individual face images are correctly identified can be higher than attempting to identify individual face images in isolation.

20 Claims, 8 Drawing Sheets

U.S. PATENT DOCUMENTS

2008/0298766 A1  12/2008  Wen et al.
2008/0304755 A1  12/2008  Xiao et al.
2009/0103887 A1  4/2009  Choi et al.

OTHER PUBLICATIONS

Jae Young Choi, Sengji Yang, Yong Man Ro, and Konstantinos N. Plataniotis, "Face Annotation for Personal Photos Using Context-Assisted Face Recognition", Oct. 30-31, 2008, ACM, pp. 44-51.*

Ming Zhang, Yong Wei Teo, Siliang Liu, Tat-Seng Chua, and Ramesh Jain, "Automatic Person Annotation of Family Photo Album", 2006, Springer-Verlag Berlin Heidelberg, pp. 163-172.*

Lei Zhang, Yuxiao Hu, Mingjing Li, Weiying Ma, and Hongjiang Zhang, "Efficient Propogation for Face Annotation in Family Albums", Oct. 10-16, 2004, ACM.*

Ma, et al.; "An Indexing and Browsing System for Home Video"; X European Signal Processing Conference (invited paper); Finland, Sep. 2000; pp. 1-4.

Naaman, et al.; "Leveraging Context to Resolve Identity in Photo Albums"; Proceedings of the 5$^{th}$ ACM/IEEE-CS Joint Conference on Digital Libraries; Denver, CO; 2005; pp. 178-187.

Suh, B.; "Image Management Using Pattern Recognition Systems"; Dissertation for Doctor of Philosophy Degree; University of Maryland; 2005; pp. 1-190.

Hohlt, et al., "Active Learning for Video Annotation", Retrieved at <<http://www.cs.berkeley.edu/~hohltb/papers/active_learning.pdf>>, Technical Report TJ Watson, Aug. 2001, pp. 4.

Culotta, et al., "Reducing Labeling Effort for Structured Prediction Tasks", Retrieved at <<http://www.cs.umass.edu/~culotta/pubs/culotta05reducing.pdf>>, Proceedings of the 20th national conference on Artificial intelligence—vol. 2, 2005, pp. 6.

Stone, et al., "Autotagging Facebook: Social Network Context Improves Photo Annotation", Retrieved at <<http://www.eecs.harvard.edu/~zickler/papers/Autotag_IVW2008.pdf>>, IEEE Computer Society Conference on Computer Vision and Pattern Recognition Workshops, Jun. 23-28, 2008, pp. 8.

Tian, et al., "A Face Annotation Framework with Partial Clustering and Interactive Labeling", Retrieved at <<http://ieeexplore.ieee.org/stamp/stamp.jsp?arnumber=04270307>>, IEEE Conference on Computer Vision and Pattern Recognition, Jun. 17-22, 2007, pp. 8.

"Riya Visual Search", Retrieved at <<http://www.riya.com>>, Retrieved Date: Jun. 8, 2009, pp. 1.

Ahonen, et al., "Face Recognition with Local Binary Patterns", Retrieved at <<http://www.springerlink.com/content/p5d9xp9gfkex5gk9/fulltext.pdf>>, Computer Vision—ECCV, 2004, pp. 469-481.

Belhumeur, et al., "Eigenfaces vs. Fisherfaces: Recognition Using Class Specific Linear Projection", Retrieved at <<http://www1.cs.columbia.edu/~belhumeur/journal/fisherface-pami97.pdf>>, IEEE Transactions on Pattern Analysis and Machine Intelligence, vol. 19, No. 7, Jul. 1997, pp. 711-720.

Chen, et al., "Face Annotation for Family Photo Album Management", Retrieved at <<http://citeseerx.ist.psu.edu/viewdoc/download;jsessionid=0B55DA63463D1601CDCF1BD7586883D0?doi=10.1.1.4.7957&rep=rep1&type=pdf>>, International Journal of Image and Graphics, vol. 3, No. 1, 2003, pp. 1-14.

Cui, et al., "EasyAlbum: An Interactive Photo Annotation System Based on Face Clustering and Re-Ranking", Retrieved at <<http://bcmi.sjtu.edu.cn/~tianyuandong/EasyAlbum_SigChi2007.pdf>>, CHI Proceedings. Photo Sharing, Apr. 28-May 3, 2007, pp. 367-376.

Davis, et al., "Using Context and Similarity for Face and Location Identification", Retrieved at <<http://fusion.sims.berkeley.edu/GarageCinema/pubs/pdf/pdf_85920217-199D-44C4-A6BC264BA7391EE3.pdf>>, In Proceedings of the IS&T/SPIE 18th Annual Symposium on Electronic Imaging Science and Technology, 2006, pp. 9.

Girgensohn, et al., "Leveraging Face Recognition Technology to Find and Organize Photos", Retrieved at <<http://www.fxpal.com/publications/FCPAL-PR-04-283.pdf>>, MIR, Oct. 15-16, 2004, pp. 8.

He, et al., "Laplacian Score for Feature Selection", Retrieved at <<http://people.cs.uchicago.edu/~xiaofei/NIPS2005_LS.pdf>>, Advances in Neural Information Processing Systems 18, Neural Information Processing Systems, Dec. 5-8, 2005, pp. 8.

Lin, et al., "Recognize High Resolution Faces: From Macrocosm to Microcosm", Retrieved at <<http://mmlab.ie.cuhk.edu.hk/2006/01640915.pdf>>, IEEE Computer Society Conference on Computer Vision and Pattern Recognition, 2006, pp. 1355-1362.

Ma, et al., "Robust Precise Eye Location under Probabilistic Framework", Retrieved at <<http://ieeexplore.ieee.org/stamp/stamp.jsp?tp=&isnumber=28919&arnumber=1301554>>, Sixth IEEE International Conference on Automatic Face and Gesture Recognition, May 17-19, 2004, pp. 339-344.

Ng, et al., "On Spectral Clustering: Analysis and An Algorithm", Retrieved at <<http://citeseerx.ist.psu.edu/viewdoc/download;jsessionid=D2F846B484F746AE8082724DA22903AA?doi=10.1.1.19.8100&rep=rep1&type=pdf>>, In Advances in Neural Information Processing Systems, 2001, pp. 849-856.

Suh, et al., "Semi-Automatic Image Annotation Using Event and Torso Identification", Retrieved at <<http://hcil.cs.umd.edu/trs/2004-15/2004-15.pdf>>, Human Computer Interaction Laboratory, 2004, pp. 4.

Turk, et al., "Eigenfaces for Recognition", Retrieved at <<http://www.vision.ee.ethz.ch/~bleibe/multimedia/teaching/cv-ws08/supplementary/turk-eigenfaces-jcn91.pdf>>, Journal of Cognitive Neuroscience, vol. 3, No. 1, 1991, pp. 71-86.

Viola, et al., "Rapid Object Detection Using a Boosted Cascade of Simple Features", Retrieved at <<http://research.microsoft.com/en-us/um/people/viola/pubs/detect/violajones_cvpr2001.pdf>>, Proceedings of the IEEE Computer Society Conference on Computer Vision and Pattern Recognition, vol. 1, 2001, pp. 1-9.

Wang, et al., "Random Sampling LDA for Face Recognition", Retrieved at <<http://mmlab.ie.cuhk.edu.hk/~wxg/Publications/CVPR04_RandomSamplingLDA.pdf>>, Proceedings of the IEEE Computer Society Conference on Computer Vision and Pattern Recognition, vol. 2, Jun. 27-Jul. 2, 2004, pp. 7.

Wang, et al., "A Unified Framework for Subspace Face Recognition", Retrieved at <<http://mmlab.ie.cuhk.edu.hk/2004/PAMI04_Face.pdf>>, IEEE Transactions on Pattern Analysis and Machine Intelligence, vol. 26, No. 9, Sep. 2004, pp. 1222-1228.

Wang, et al., "Random Sampling for Subspace Face Recognition", Retrieved at <<http://mmlab.ie.cuhk.edu.hk/2006/IJCV06_face.pdf>>, International Journal of Computer Vision, vol. 70, No. 1, Oct. 2006, pp. 91-104.

Zhang, et al., "Automated Annotation of Human Faces in Family Albums", Retrieved at <<http://research.microsoft.com/en-us/um/people/leizhang/Paper/ACMMM03.pdf>>, Proceedings of the eleventh ACM international conference on Multimedia, Nov. 2-8, 2003, pp. 4.

Zhang, et al., "Efficient Propagation for Face Annotation in Family Albums", Retrieved at <<http://research.microsoft.com/en-us/um/people/leizhang/paper/acm04-facepropagation.pdf>>, Proceedings of the 12th annual ACM international conference on Multimedia, Oct. 10-16, 2004, pp. 8.

Zhao, et al., "Automatic Person Annotation of Family Photo Album", Retrieved at <<http://www.springerlink.com/content/f703366568hgp655/fulltext.pdf>>, Proceedings of the 5th international conference on Image and Video Retrieval, 2006, pp. 163-172.

Zhao, et al., "Face recognition: A literature survey", Retrieved at <<http://citeseerx.ist.psu.edu/viewdoc/download?doi=10.1.1.31.7692&rep=rep1&type=pdf>>, ACM Computing Surveys (CSUR), vol. 35, No. 4, Dec. 2003, pp. 67.

* cited by examiner

System 200

Initial Identification Table 202(1)

| Face Image # 206 | Photo # 208 | Identity 210 | C. D. Prob 212 | Isol. Prob 214 |
|---|---|---|---|---|
| 104(1) | 102(1) | Person A | 0.6 | 0.5 |
| 104(2) | 102(2) | Person A | 0.8 | 0.6 |
| 104(3) | 102(3) | Person A | 0.6 | 0.3 |
| - | - | - | - | - |
| 104(4) | 102(4) | Person B | 0.1 | 0.3 |
| - | - | Person A | 0.6 | 0.3 |
| 104(5) | 102(5) | Person B | 0.2 | 0.3 |
| 104(6) | 102(6) | Person B | 0.6 | 0.3 |
| 104(7) | 102(6) | Person A | 0.6 | 0.3 |
| 104(8) | 102(7) | Person B | 0.7 | 0.4 |
| 104(9) | 102(7) | Person C | 0.2 | 0.1 |
| 104(10) | 102(7) | Person B | 0.5 | 0.5 |
| 104(11) | 102(8) | Person A | 0.6 | 0.3 |
| 104(12) | 102(8) | Person B | 0.4 | 0.3 |
| - | - | Person A | 0.4 | 0.3 |
| - | - | Person B | 0.6 | 0.3 |

216(1) – 216(16) point to rows above.

Indexed Identification Table 204(1)

| Face Image # 220 | Photo # 222 | Identity 224 |
|---|---|---|
| | | |
| | | |
| | | |

226(1), 226(2), 226(3)

Initial Identification Table 202(2)

| Face Image # 206 | Photo # 208 | Identity 210 | C. D. Prob 212 | Isol. Prob 214 |
|---|---|---|---|---|
| 104(1) | 102(1) | Person A | 0.7 | 0.5 |
| 104(2) | 102(2) | Person A | 0.99 | 0.6 |
| 104(3) | 102(3) | Person A | 1.0 | 0.3 |
| 104(4) | 102(4) | Person B | 0.0 | 0.3 |
| 104(5) | 102(5) | Person B | 0.96 | 0.3 |
| 104(6) | 102(6) | Person B | 0.01 | 0.3 |
| 104(7) | 102(6) | Person B | 0.6 | 0.3 |
| 104(8) | 102(7) | Person C | 0.7 | 0.4 |
| 104(9) | 102(7) | Person B | 0.2 | 0.1 |
| 104(10) | 102(8) | Person A | 0.5 | 0.5 |
| 104(11) | 102(8) | Person B | 0.7 | 0.3 |
| 104(12) | — | Person A | 0.4 | 0.3 |
| — | — | Person B | 0.5 | 0.3 |
| — | — | Person A | 0.7 | 0.3 |
| — | — | Person B | 0.3 | 0.3 |

Indexed Identification Table 204(2)

| Face Image # 220 | Photo # 222 | Identity 224 |
|---|---|---|
| 104(2) | 102(2) | Person A |
| 104(3) | 102(3) | Person A |
| 104(4) | 102(4) | Person A |

FIG. 3

SYSTEM 200

INITIAL IDENTIFICATION TABLE 202(3)

| | FACE IMAGE # 206 | PHOTO # 208 | IDENTITY 210 | C. D. PROB 212 | ISOL. PROB 214 |
|---|---|---|---|---|---|
| 216(1) → | 104(1) | 102(1) | PERSON A | 0.7 | 0.5 |
| 216(2) → | 104(2) | 102(2) | PERSON A | 0.99 | 0.6 |
| 216(3) → | 104(3) | 102(3) | PERSON A | 1.0 | 0.3 |
| 216(4) → | - | - | PERSON B | 0.0 | 0.3 |
| 216(5) → | 104(4) | 102(4) | PERSON A | 0.96 | 0.3 |
| 216(6) → | - | - | PERSON B | 0.01 | 0.3 |
| 216(7) → | 104(5) | 102(5) | PERSON B | 0.6 | 0.3 |
| 216(8) → | 104(6) | 102(6) | PERSON A | 0.7 | 0.3 |
| 216(9) → | 104(7) | 102(6) | PERSON B | 0.7 | 0.4 |
| 216(10) → | 104(8) | 102(7) | PERSON C | 0.2 | 0.1 |
| 216(11) → | 104(9) | 102(7) | PERSON B | 0.55 | 0.5 |
| 216(12) → | 104(10) | 102(7) | PERSON A | 0.75 | 0.3 |
| 216(13) → | 104(11) | 102(8) | PERSON B | 0.0 | 0.3 |
| 216(14) → | - | - | PERSON B | 1.0 | 0.3 |
| 216(15) → | 104(12) | 102(8) | PERSON A | 0.96 | 0.3 |
| 216(16) → | - | - | PERSON B | 0.01 | 0.3 |

INDEXED IDENTIFICATION TABLE 204(3)

| | FACE IMAGE # 220 | PHOTO # 222 | IDENTITY 224 |
|---|---|---|---|
| 226(1) → | 104(2) | 102(2) | PERSON A |
| 226(2) → | 104(3) | 102(3) | PERSON A |
| 226(3) → | 104(4) | 102(4) | PERSON A |
| 402(1) → | 104(11) | 102(8) | PERSON B |
| 402(2) → | 104(12) | 102(8) | PERSON A |

ASSISTED FACE RECOGNITION TAGGING

BACKGROUND

Digital photography has greatly increased the number of pictures that people (i.e., users) take. Users also enjoy the digital platform so that they can download (and/or upload) all of their digital pictures to a central location, such as a photo gallery. One problem that has carried over from the old print photography paradigm relates to organization (or lack thereof). For instance, in the old paradigm, a user may flip through a whole drawer full of prints to try to find a particular picture or pictures relating to a specific person. Similarly, in the digital paradigm, the user may scan through hundreds of thumbnail images looking for a particular photograph. Organizational tools can be utilized to aid the user in the old print paradigm and/or the new digital paradigm. However, the organizational tools tend to be so cumbersome and time consuming that they are rarely employed. Thus, users tend to continue to tediously scan through multitudes of pictures to find what they are looking for.

SUMMARY

The described implementations relate to assisted face recognition tagging of digital images, and specifically to context-driven assisted face recognition tagging. In one case, context-driven assisted face recognition tagging (CDAFRT) tools can access face images associated with a photo gallery. The CDAFRT tools can perform context-driven face recognition to identify individual face images at a specified probability. In such a configuration, the probability that the individual face images are correctly identified can be higher than attempting to identify individual face images in isolation.

In another case, CDAFRT tools can evaluate face images from the user's photo gallery. The CDAFRT tools can utilize context-driven analysis to determine an individual face image to present to the user for manual identification. The context-driven analysis can decrease a number of user actions employed to correctly identify face images in the photo gallery and thereby increase a likelihood that the user will actually organize the photo gallery.

The term "CDAFRT tool(s)" may refer to device(s), system(s), computer-readable instructions (e.g., one or more computer-readable media having executable instructions), component(s), module(s), and/or methods, among others, as permitted by the context above and throughout the document. In various instances, CDAFRT tools may be implemented as hardware, software, firmware, or combination thereof. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application relates to context-driven assisted face recognition tagging. Face recognition techniques can be employed to detect face images in a set of photos, such as photos of a user's photo gallery. Context-driven assisted face recognition tagging (CDAFRT) tools can be employed to identify the detected face images of the set of photos in a manner that can be desirable to the user. For instance, the user may find it desirable to have every face image in every photo correctly identified. One way to accomplish this is for the user to manually tag all the face images. The user probably would not find such a solution to be desirable. Instead, the user likely wants this to be accomplished with as little effort as possible on the user's part. Context-driven assisted face recognition tagging concepts can address this and/or other scenarios. These concepts are discussed below by way of example.

Figure 1:
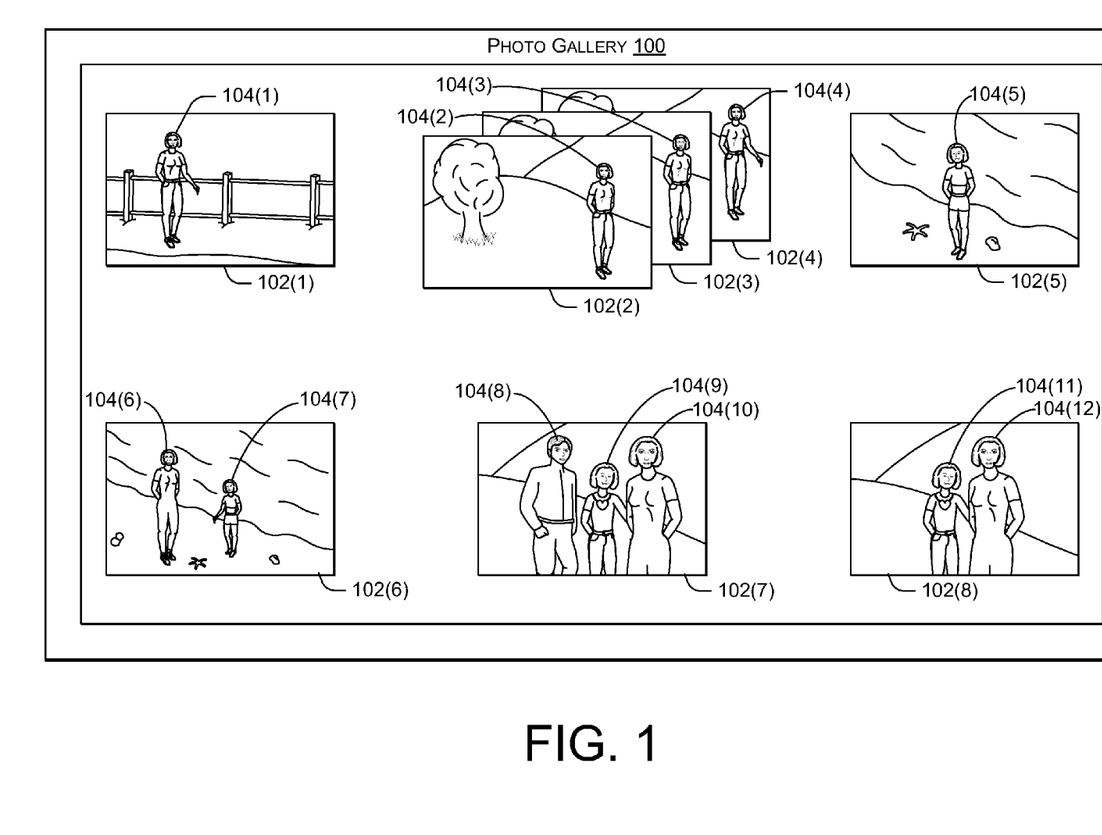
FIG. 1 illustrates an example of a photo gallery upon which context-driven assisted face recognition tagging can be accomplished in accordance with some implementations of the present concepts.

For purposes of explanation consider FIG. 1 which shows a hypothetical gallery of user photos at 100. In this example, photo gallery 100 includes eight photos 102(1)-102(8) with a total of 12 identified faces 104(1)-104(12). Photos 102(2)-102(4) represent a series of three photos taken in close temporal sequence, such as in a camera's 'burst mode'. For instance, photos 102(2) and 102(3) can be separated by 0.1 seconds and photos 102(3) and 102(4) can be separated by 0.1 seconds. Alternatively, photos 102(2)-102(4) could be three frames from a video recording taken by the user.

CDAFRT tools can identify individual face images 104(1)-104(12) of gallery 100. For instance, CDAFRT tools can identify face image 104(1) as hypothetical 'Person A' with a probability of 0.5. Rather than identifying face images in isolation (i.e., just from data of the face image) the CDAFRT tools can utilize context related information in assigning of identities and associated probabilities.

As used herein, "context" can include information within an individual photo and/or inter-photo contextual information. For instance, consider face images 104(11) and 104(12) of photo 102(8). These two face images show female faces with similar features and similar hair styles. When viewed in isolation, face images 104(11) and 104(12) may be wrongly identified by a face recognition technique as being the same person. In contrast, with context-driven face recognition, the fact that the two face images appear in the same photo is a strong indicator that they are not the same person. For instance, unless a person is holding a photo of themselves in the photo, that person is not going to be in a photo twice. This is an example of a negative contextual factor that makes two face images less likely to be of the same person.

Other contextual factors can make it more likely that two face images are of the same person. For instance, consider photos 102(2)-102(4). Notice that face images 104(2)-104(4) appear to be of the same person. However, in this case, in photo 102(3) the person's eyes are closed. This might make accurate identification of face image 104(3) difficult with traditional face recognition techniques. However, when considered in the context that images 102(2) and 102(3) are only separated by a 0.1 seconds and that face image 104(3) appears in approximately the same region of photo 102(3) as face image 104(2) in photo 102(2) it is highly likely (i.e., more probable) that these two face images are of the same person.

The probability that the two face images 104(2) and 104(3) are of the same person could be even higher if photos 102(2)-102(3) are consecutive frames from a video that are only separated by roughly 1/30 of a second. The same context-driven rationale can be applied to photos 102(3)-102(4). In these examples of temporally close photo sequences, the probability that the individual face images are correctly identified can be higher when viewed in context than attempting to identify individual face images in isolation. These concepts are explained below in relation to FIGS. 2-4, which relate to, and are discussed collectively with, FIG. 1.

Figure 2:
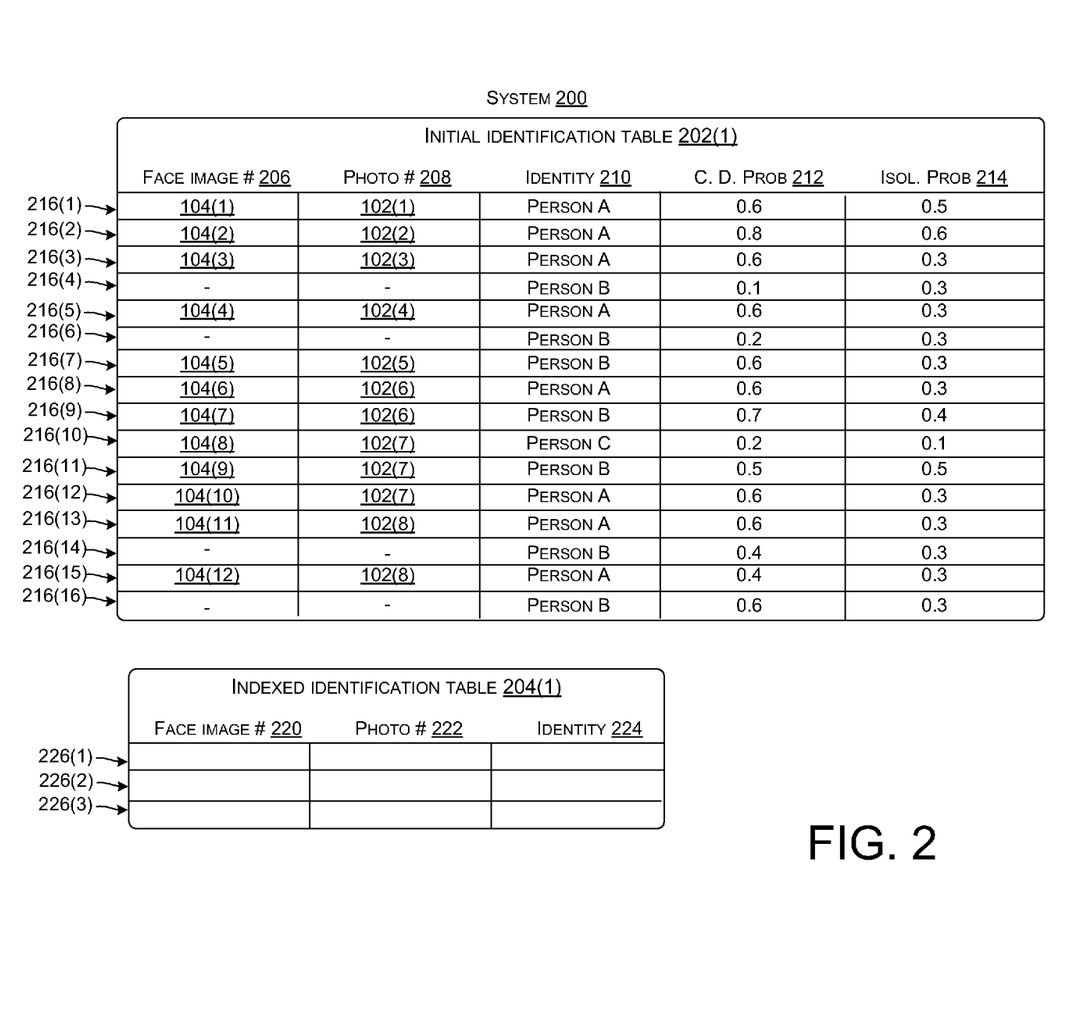
FIGS. 2-7 are examples of context-driven assisted face recognition tagging systems in accordance with some implementations of the present concepts.

FIG. 2 shows a system 200 that includes an initial identification table 202(1) and an indexed identification table 204(1). Initial identification table 202(1) and indexed identification table 204(1) can be generated by CDAFRT tools. Initial identification table 202(1) can include a face image number column 206, a photo number column 208, an identity column 210, a context-driven probability column 212, and an isolated probability column 214. (The isolated probability column 214 is added for purposes of explanation and likely will not be present in at least some implementations of the initial identification table). In this case, the initial identification table 202(1) is further referenced by sixteen rows 216(1)-216(16).

Indexed identification table 204(1) includes a face image number column 220, a photo number column 222, and an identity column 224. Initially, indexed identification table 204(1) does not contain any entries as indicated by blank rows 226(1)-226(3). As should become apparent from the discussion below, the indexed identification table can be thought of as a table or database of known face images.

At this point, initial identification table 202(1) contains at least one entry (i.e. row) for each face image 104(1)-104(12) of photo gallery 100. In some implementations, individual face images are added from initial identification table 202(1) to indexed identification table 204(1) when their identity is certain (i.e., probability of 1.0). One way that a face image can have a probability of 1.0 is when the user specifies the identity of the face image. Other implementations can add individual face images to the indexed identification table when their probability exceeds a predefined threshold, such as 0.95, for instance.

Initial identification table's row 216(1) relates to face image 104(1) as evidenced by face image number column 206. Face image 104(1) is contained in photo 102(1) as evidenced by photo number column 208. Face image 104(1) is identified as hypothetical "Person A" with a context-driven probability of 0.6. For comparison sake, an isolated probability might be calculated as 0.5 as indicated by column 214. For sake of brevity, most face images are probabilistically identified with only a single person in initial identification table 212(1). However, several face images are identified with more than one person for purposes of explanation.

Consider face image 104(3) in relation to rows 216(3) and 216(4) as one such example. In this case, as indicated in row 216(3) face image 104(3) is identified as "Person A" with a context-driven probability of 0.6 as indicated by column 212. Row 216(4) indicates that alternatively, face image 104(3) is identified as "Person B" with a context-driven probability of 0.1. It is worth noting that the context-driven probability that face image 104(3) is Person A is much higher than the isolated probability (0.6 versus 0.3). Remember that as mentioned above, photo 102(2) that contains face image 104(2) was taken by the same camera only 0.1 seconds earlier. This temporal proximity (and similar face position in the respective photos) combined with the fact that face image 104(2) is identified as Person A with a relatively high context-driven probability of 0.8 raises the probability that face image 104(3) is also Person A. A similar phenomenon can be seen with face image 104(4) which was taken 0.1 seconds after face image 104(3).

Now, the CDAFRT tools can select an individual image to present to the user for manual identification. Thus, the CDAFRT tools can ask the user to manually identify one of face images 104(1)-104(12). The CDAFRT tools can utilize contextual information in making the selection. In one case, the CDAFRT tools can select the face image that is identified with a high (and potentially highest) uncertainty. In the present example, the face image that is associated with the highest uncertainty may be face image 104(8). This face image is identified as "Person C" with a context-driven probability of 0.2 as indicated in row 216(10). In such a case, upon user identification, face image 104(8) can then be added to indexed identification table 204(1). (This example is not represented in the FIGS.).

Alternatively, the CDAFRT tools can select the face image that potentially offers the greatest information gain in context-driven probabilities across initial identification table 202(1). For instance, the CDAFRT tools may pick face image 104(3). Recall that face image 104(3) occurs in the middle photo 102(3) of the three photo burst that starts with photo 102(2) and finishes with 102(4). In this case, the context-driven identification for face image 104(3) stands at Person A with a probability of 0.6 and Person B with a probability of 0.1. Further assume that the user identifies that face image 104(3) is in fact Person A.

In this case, face image 104(3) is automatically added to indexed identification table 204(1) since it's probability of 1.0 satisfies the threshold of 0.95. Further, since the probabilities for face image 104(3) change, the context-driven probabilities of the remaining members of initial identification table 202(1) can change and as such can be recalculated. Viewed another way, the entries of the indexed identification table 204(1) can become contextual training data for calculating the context-driven probabilities of face images of the initial identification table 202(1).

Figure 3:
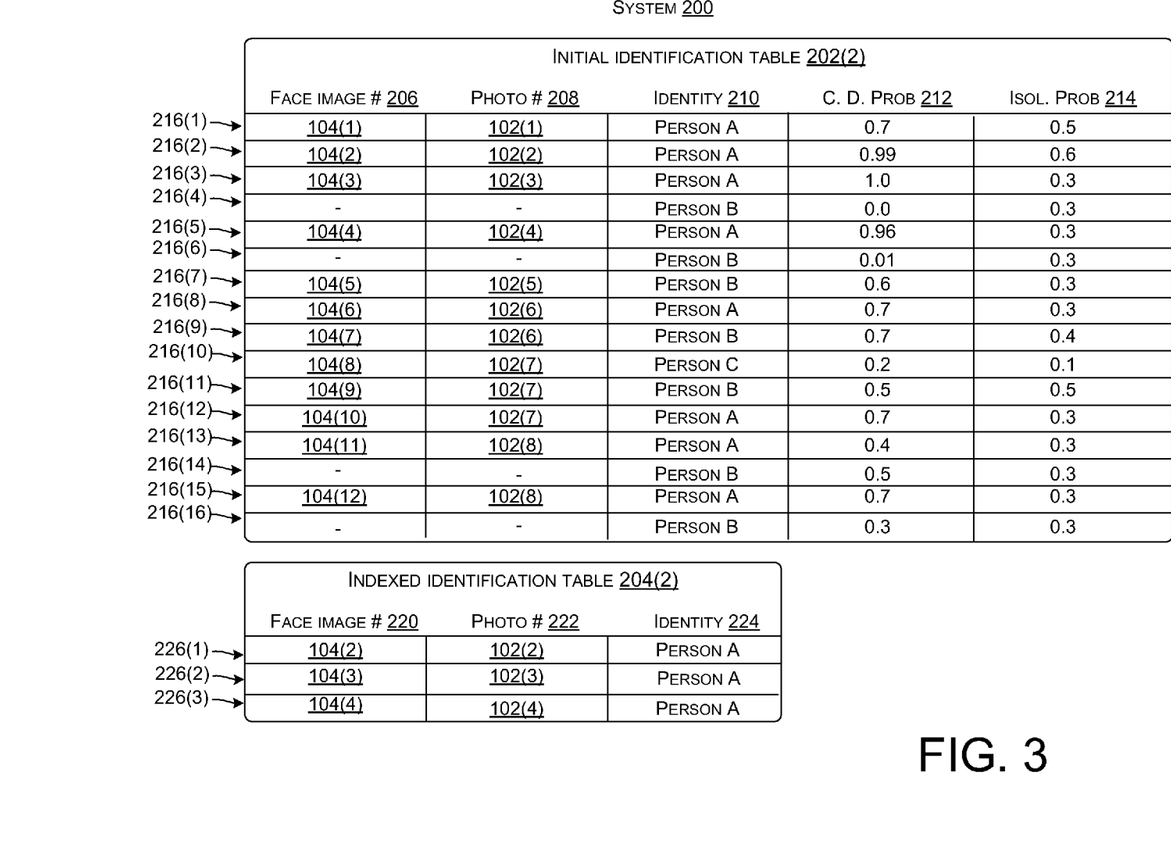

The new recalculated results can be seen in FIG. 3 which shows a subsequent view of initial identification table (now 202(2)). In this case, for purposes of explanation, row 216(3) shows that face image 104(3) is Person A with a probability of 1.0. The probability of face image 104(3) being Person B has been changed from 0.1 to 0. Also, the context-driven probability that face image 104(2) is Person A has risen from 0.8 percent to 0.99 percent due to the above described contextual ties to face image 104(3). Similarly, the context-driven probability that face image 104(4) is Person A has risen from 0.6 percent to 0.96 percent. Thus, in an implementation that sets a predefined probability threshold of 0.95, both face image 104(2) and 104(4) qualify for entry into indexed identification table 204(2) along with face image 104(3). In this example, by selecting an individual face image for manual identification based upon contextual factors, three face images were positively identified via a single user action.

While only the most significant context-driven probability changes are discussed with specificity, other context-driven face image probabilities of initial identification table 202(2) can also be affected (i.e., compare context-driven probabilities 212 of FIG. 2 and FIG. 3). Note, in contrast, that probabilities taken in isolation (i.e., column 214) are not affected by the contextual change created by the user identification of face image 104(3).

Next, the CDAFRT tools might select face image 104(11) or 104(12) for manual identification. As mentioned above, these two face images appear on the same photograph and as such are unlikely to be of the same person. The CDAFRT can convey a high degree of probability that one of the people in the picture is Person A and that the other is Person B. Yet the CDAFRT tools can have difficulty telling which is which. For instance, this could be because the two people in the photo have similar features. By having the user manually identify either of these two face images, the probability of correctly identifying the other face image without user assistance greatly increases. For instance, if the user positively identifies face image 104(11) as Person B, then the recalculated context-driven probability of face image 104(12) being Person A can rise substantially, such as from 0.7 to 0.96. These changes can be evidenced in the initial identification table 202(3) of FIG. 4.

Figure 4:
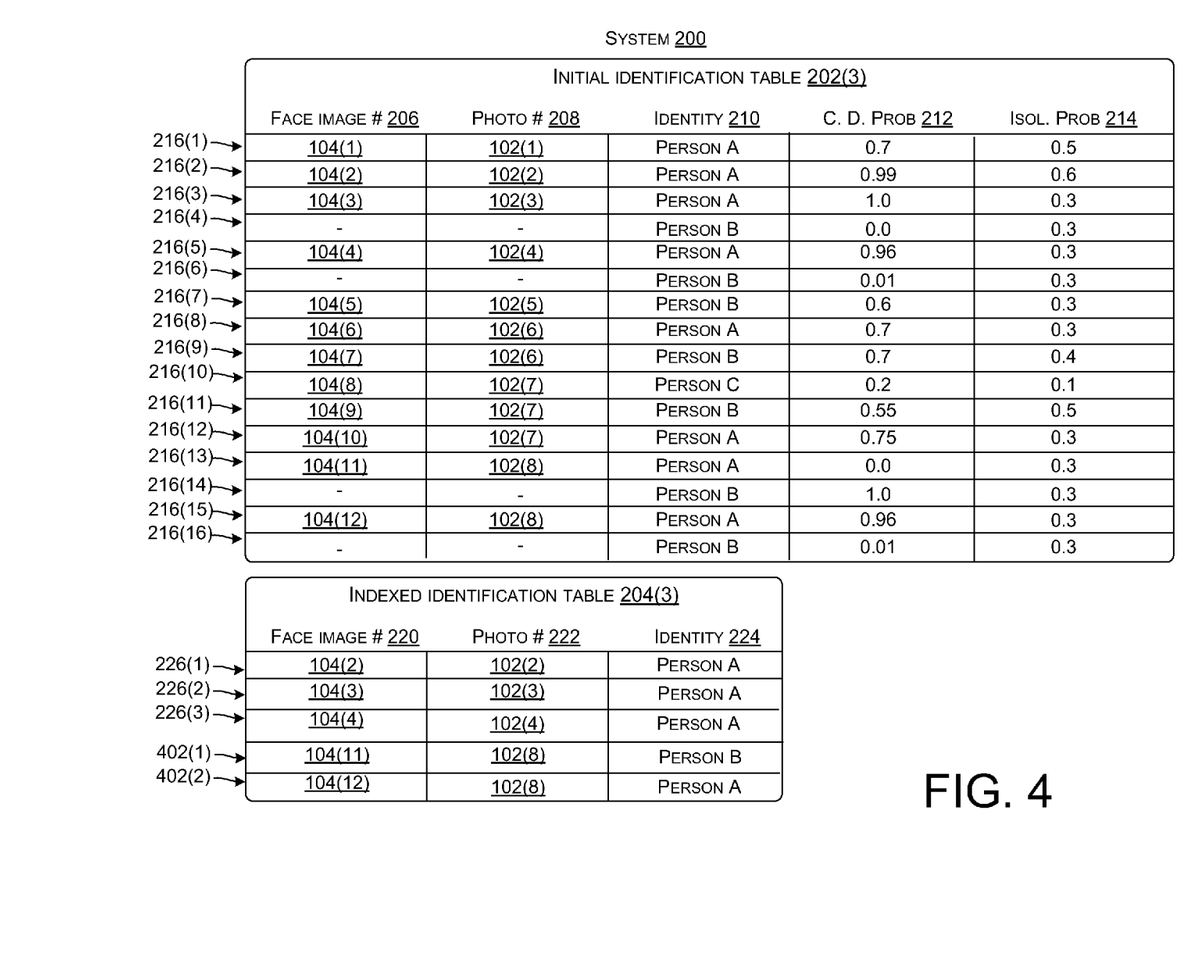

In this example, the manual identification of face image 104(11) caused both face image 104(11) and face image 104(12) to be added to indexed identification table 204(3) in rows 402(1) and 402(2), respectively. Just to clarify, face image 104(11) can be added to the indexed identification table since it was identified by the user. The user identification is interpreted as probability 1.0. The recalculated context-driven probability of face image 104(12) of being person A is 0.96. Thus, both the 1.0 probability of face image 104(11) being person A and the 0.96 probability of face image 104(12) being person B satisfy the 0.95 probability threshold for entry into the indexed identification table.

In this scenario, two face images were positively identified through a single user action. This process can be strategically repeated in a context-driven manner until all of the face images are positively identified (i.e., identified at a probability that satisfies the predefined threshold). The present implementations can positively identify all of the face images in a photo gallery with fewer user actions than existing technologies. Some implementations may even optimize the process so that the fewest possible number of user actions are utilized to positively identify the face images of the photo gallery.

The positively identified face images can be added to the indexed identification table 204(3). The indexed identification table can be very useful to the user. For instance, a user-interface can be generated for the user that leverages the indexed identification table. For example, if the user wants to see photos of Person A, the user can simply enter "Person A" in the user-interface. An underlying architecture can reference Person A in the indexed identification table (i.e. via identify column 224) and present the corresponding photos that contain Person A on the user-interface.

To summarize, by utilizing context-driven analysis to determine an individual face image to present to the user for manual identification the CDAFRT tools can decrease a number of user actions employed in the identification process. By decreasing the number of user actions employed to correctly identify face images in the photo gallery the CDAFRT tools can increase a likelihood that the user will actually organize the photo gallery.

First System Example

Figure 5:
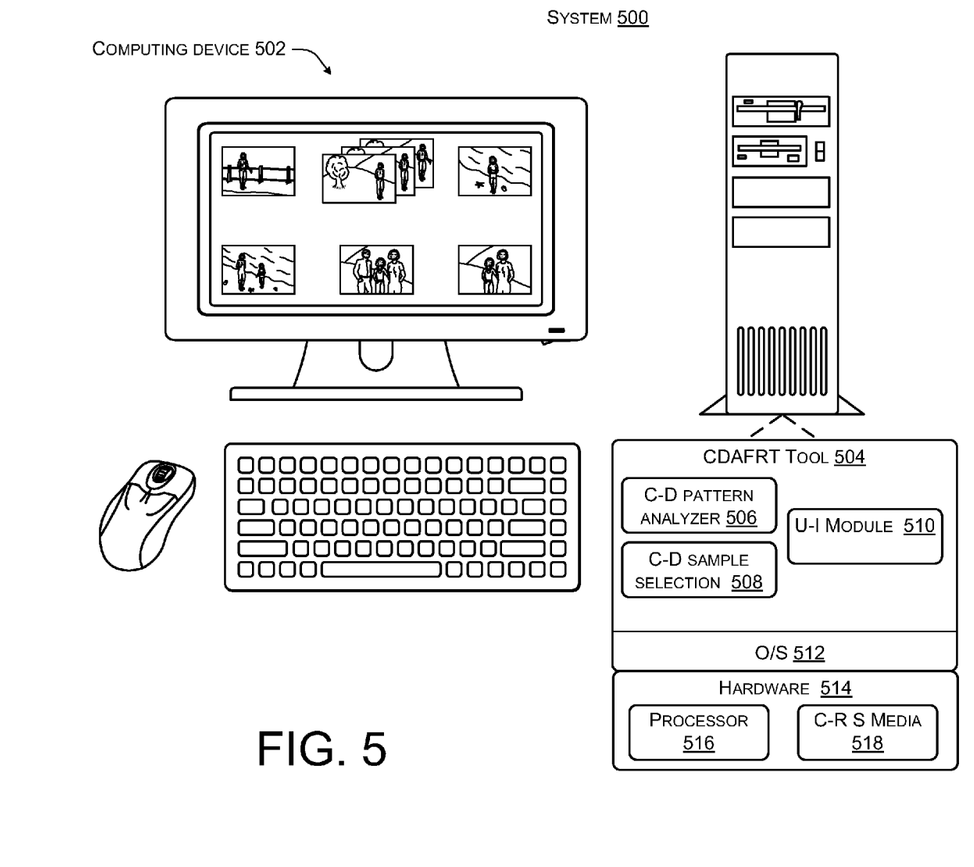

FIG. 5 shows a system 500 for accomplishing context-driven assisted face recognition tagging. In this case, system 500 includes a computing device 502 that includes a CDAFRT tool 504. The CDAFRT tool can include a context-driven pattern analyzer 506, a context-driven sample selection module 508, and a user-interface module 510. CDAFRT tool 504 can operate upon an operating system 512 and a hardware layer 514. The hardware layer can include a processor 516 and computer-readable storage media 518. The operating system and hardware layer are presented to orient the reader and are not described further herein.

Context-driven pattern analyzer 506 can calculate context-driven probable identities of face images from a photo gallery of a user. For instance, the context-driven pattern analyzer can consider a context of the face images in the photo gallery when calculating the probable identities.

Context-driven sample selection module 508 can select an individual face image to present to the user for manual identification based upon the context. For instance, user identification of some face images can increase overall gallery probabilities more than other face images. In some implementations, the context-driven sample selection module can select face images which are relatively more uncertain than others. Stated another way, and/or in other implementations, context-driven sample selection module can select the individual face image from the individual face images that offers a potentially high information gain.

The context-driven sample selection module 508 can move the user identified face image to a database of known face images associated with the user. The indexed identification table 204(2) of FIG. 3 can be thought of as an example of a database of known images. The context-driven sample selection module can cause the context-driven pattern analyzer 506 to recalculate probable identities for the remaining individual face images of the photo gallery based upon the user-supplied identification as one contextual aspect.

User-interface module 510 can cause the individual face image selected by context-driven sample selection module 508 to be presented to the user and to deliver a user-supplied identification of the individual face image to the context-driven pattern analyzer module.

Second System Example

Figure 6:
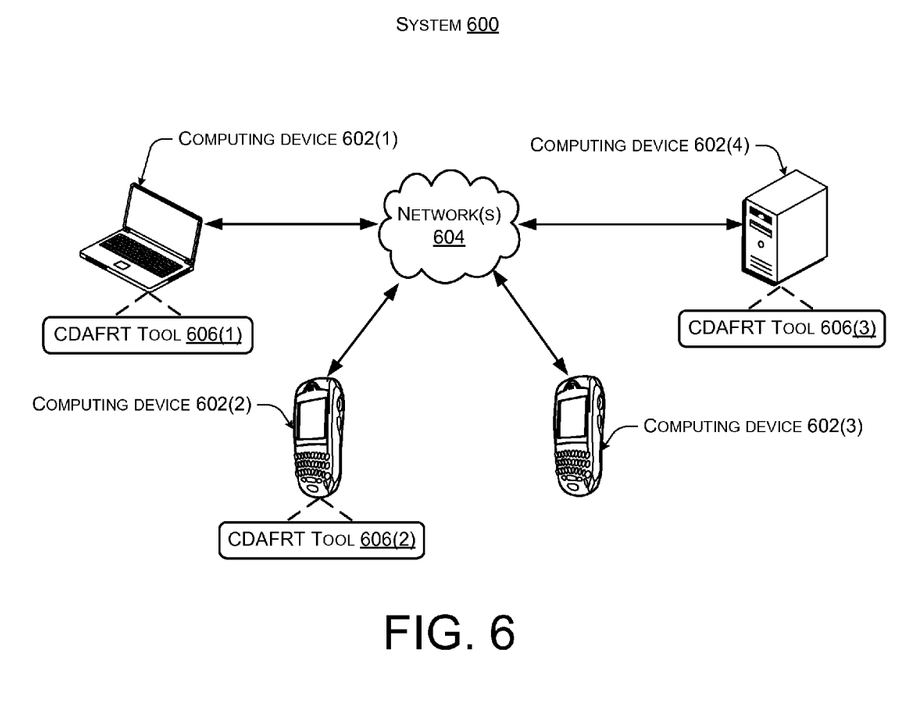

FIG. 6 shows a system 600 for accomplishing context-driven assisted face recognition tagging. System 600 includes four computing devices 602(1), 602(2), 602(3), and 602(4). The computing device can be coupled via one or more networks 604, such as a local area network and/or a wide area network, such as the Internet.

In this case, computing device 602(1) is manifest as a notebook computer, computing devices 602(2) and 602(3) are manifest as Smartphones, and computing device 602(4) is manifest as a desktop computing device or server. In other cases, computing devices can be manifest as cameras, video cameras, cell phones, personal digital assistants (PDAs), netbooks, or any other type of ever-evolving classes of computing devices that may or may not have photo capturing capabilities.

Any of computing devices 602(1)-602(4) can include a CDAFRT tool. In this case, computing device 602(1) includes a CDAFRT tool 606(1), computing device 602(2) includes a CDAFRT tool 606(2) and computing device 602(4) includes a CDAFRT tool 606(3).

Computing device 602(1) can act in a standalone configuration, such as that described above in relation to FIG. 5. For instance, all photos of a photo gallery can be contained on computing device 602(1) and all processing associated with context-driven assisted face recognition tagging can be performed on computing device 602(1). Alternatively, the photo gallery can be located on computing device 602(4) but processed on computing device 602(1). Alternatively still, some of the context-driven assisted face recognition tagging can be performed on computing device 602(1) and some on computing device 602(4). For instance, computing device 602(2) may have sufficient processing and/or memory resources to perform some context-driven assisted face recognition tagging while the remainder (i.e., the resource intensive portions) can be performed on computing device 602(4). Further still, computing device 602(3) can be resource constrained to the point that all of the context-driven assisted face recognition tagging can be performed on computing device 602(4) but displayed on computing device 602(3) for the user.

Further CDAFRT Examples

These examples can include a probabilistic discriminative model that can be employed by CDAFRT tools. The probabilistic discriminative model aims to induce a probability distribution over class labels by both considering the face images as well as known constraints (i.e. the context of the face images). In particular, in some cases the probabilistic discriminative model can consist of a Gaussian process (GP) prior, which enforces a smoothness constraint on the labels, and a Markov random field (MRF) that enforces both the match and non-match constraints. Some of the present implementations can utilize an efficient variational message passing to infer the unobserved labels given the face regions and a set of known labels. Because of the probabilistic nature of probabilistic discriminative model, it can provide the information to develop an active learning criterion. In particular, the active learning selection criterion can utilize uncertainty estimates to determine the next face image to tag (i.e., have the user identify).

Active Learning with Constraints

Consider a scenario that involves a set of face images X={xi}. The present implementations can partition this set into a set of labeled ones $X_L$ with labels $t_L=\{t_i|i\in L\}$ and a set of unlabeled ones $X_U$. At the beginning of the tagging task, the values are $X_L=0$ and $X_U=X$. As introduced above, one goal can be to request as few labels as possible from a human user to maximize the classification rate over the entire set of images x.

If each face image is treated independently, a standard active learning criterion such as uncertainty or information gain can be used to determine the next face to tag at each step. For example, prediction algorithms such as SVMs or Gaussian Process (GP) models can be used to infer the posterior distribution $p(t_U|X,t_L)$ over unobserved labels $t_U=\{t_i|i\in U\}$. This distribution can then be used in the active learning criterion. However, a discriminative model is utilized to model dependencies between images. The discussion below describes a discriminative model that can utilize contextual constraints in order to classify unlabeled images and to determine what face to tag next.

The described probabilistic models can utilize the constraints to propagate information pertinent to content as well as other known constraints in order to infer unobserved labels. This framework can consider pairwise constraints between images that specify whether two face images are the same or different. Non-match constraints between two face images can mean that the images have different labels. Match constraints can mean that the two face images have the same label. For purposes of explanation, this discussion assumes that a set of the match and non-match constraints have been provided:

$$NMC=\{(t_i,t_j)|t_i\neq t_j\}$$

$$MC=\{(t_i,t_j)|t_i=t_j\}$$

The remainder of the discussion relates to describing a discriminative model which incorporates the constraints. The discussion then turns to how inferences can be performed in this discriminative model to compute the posterior distribution over the unobserved labels:

$$p(t_U|X,t_L) \quad (1)$$

given the input face images X, the labels added so far $t_L$, and the constraints, both non-match NMC and match MC. Finally, the discussion titled "Use in an Active Learning Criterion" shows one way how $p(t_U|X,t_L)$ can be used in the present implementations.

A Discriminative Model with Constraints

The present models can be thought of as consisting of a network of predictions that interact with one another such that the decision of each predictor is influenced by the decision of its neighbors. Specifically, given match and non-match constraints the present implementations can induce a graph where each vertex corresponds to a label $t_i, i\in L\cup U$, and is connected to its neighbors according to the given constraint. The set of edges corresponding to match and non-match edges can be denoted as $\epsilon+$ and $\epsilon-$ respectively.

Figure 7:
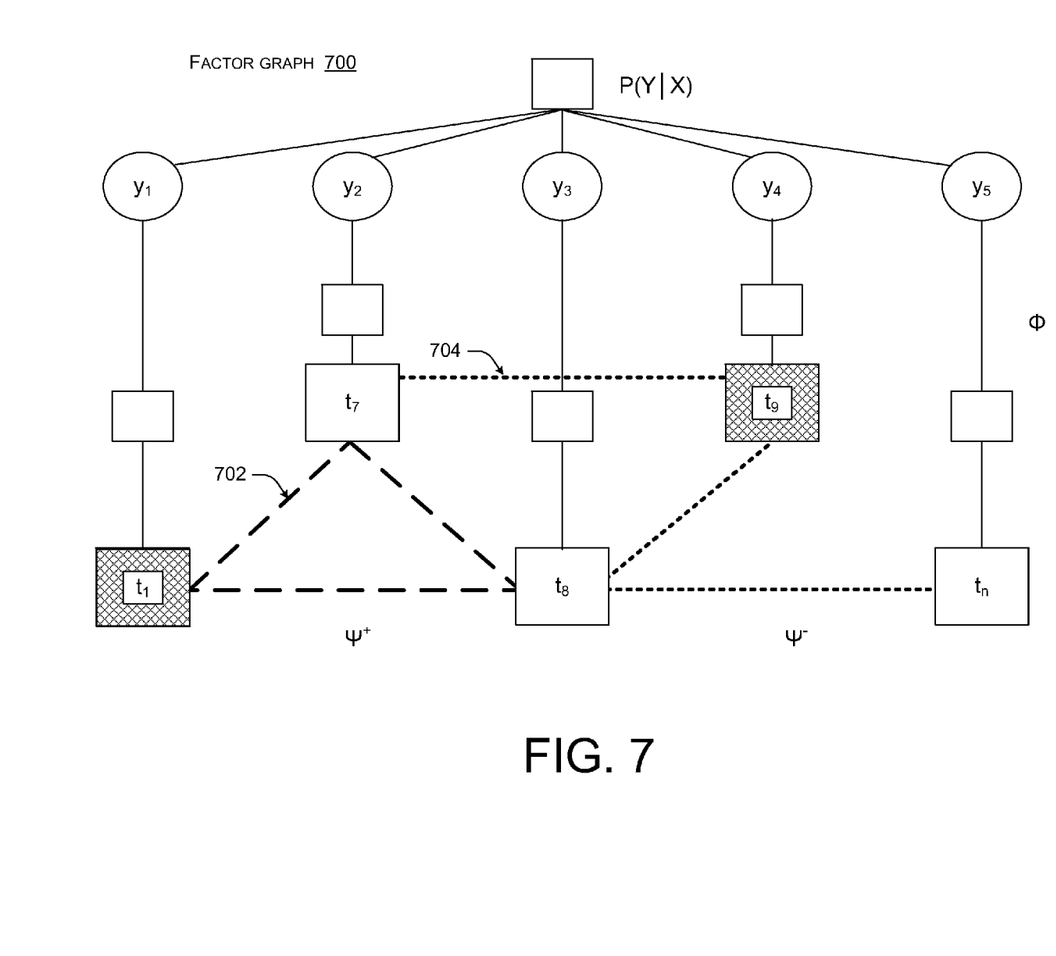

FIG. 7 illustrates a factor graph 700 corresponding to the proposed model. The class labels $\{t_i: i\in L\cup U\}$ are denoted by squares and influence each other based on different match (dashed lines 702) and non-match (dotted lines 704) constraints. In addition to these constraints, this model also imposes smoothness constraints using a GP prior. Latent variables $$Y = \{y_i\}_{i=1}^{n}$$

are introduced that use a GP prior to enforce the assumption that similar points should have similar prediction. In particular, the latent variables are assumed to be jointly Gaussian and the covariance between two outputs $y_i$ and $y_j$ is typically specified using a kernel function applied to $x_i$ and $x_j$. Formally, $p(Y|X)\sim N(0,K)$ where K is a kernel matrix with $K_{ij}=k(x_i,x_j)$ and encodes similarity between two different face regions. The rest of the discussion in this section assumes a given kernel matrix K. The section "Face Processing Pipeline" includes further details for computing this kernel matrix.

Given a pool of images, the model can induce a conditional probability distribution p(t,Y|X) using the GP prior p(Y|X) and potential functions $\phi, \psi+$ and $\psi-$. Here $\phi$ encodes the compatibility of a label t and the corresponding latent variable y. Further, $\psi+$ and $\psi-$ encode the pairwise label compatibility according to the match and non-match constraints, respectively. Thus, the conditional distribution induced by the model can be written as:

$$p(t, Y \mid X) = \frac{1}{Z} p(Y \mid X) \prod_{i=1}^{n} \phi(y_i, t_i) \times \prod_{(i,j)\in\varepsilon+} \psi+(t_i, t_j) \prod_{(i,j)\in\varepsilon-} \psi-(t_i, t_j)$$

where z is the partition function and the potentials $\phi, \psi+$ and $\psi-$ take the following form:

$$\phi(y_i, t_i) \propto e - \frac{11 y_i - \bar{t}_i 11^2}{2\sigma^2}$$

$$\psi+(t_i, t_j) = \delta(t_i, t_j)$$

$$\psi-(t_i, t_j) = 1 - \delta(t_i, t_j).$$

Here, $\delta(.,.)$ is the Dirac delta function and evaluates to 1 whenever the arguments are equal, and zero otherwise. Also, $\bar{t}_i$ is the indicator vector corresponding to $t_i$ and $\sigma^2$ is the noise parameter and determines how tight the relation between the smoothness constraint and the final label is. Changing the value of $\sigma$ can emphasize or de-emphasize the effect of the GP prior.

Note that in the absence of any match and non-match constraints the model reduces to a multi-class classification scenario with GP models. Further, the model is akin to a conditional random field (CRF), although modeling a large multiclass problem as a CRF with kernels is non-trivial due to the large number of parameters that may be required to solve such a problem. The present model does not suffer from these problems as GPs are non-parametric models.

In summary, the present models provide a powerful framework for modeling non-linear dependencies using priors induced by kernels. Also note that this is a discriminative framework that need not model P(X), given the high dimensional underlying density of observations. Moreover, as will be noted in the next section this model can allow message passing to resolve the smoothness, match and non-match constraints and infer the unobserved variables in an efficient manner. Finally, the probabilistic nature of the approach provides with valid probabilistic quantities that can be used to perform active selection of the unlabeled points.

Inference in the Model

Given some labeled data the key task is to infer $p(t_U|X, t_L)$ the posterior distribution over unobserved labels $tu = \{t_i | i \in U\}$. Performing exact inference can be prohibitive in this model primarily due to two reasons. First, notice that the joint distribution is a product of a Gaussian (GP prior and unary potentials) and non-Gaussian terms (pairwise match $\psi+$ and non-match constraints $\psi-$). Potentially more importantly, the match and the non-match constraints might induce loops in the graph making exact inference intractable. Some implementations can resort to approximate inference techniques in order to get around this potential problem. In particular, an approximate inference can be performed by maximizing the variational lower bound by assuming that the posterior over the unobserved random variable Y and $t_U$ can be factorized:

$$F = \int_{t_U, Y} q(t_U) q(Y) \log \frac{p(t_U, Y | X, t_U)}{q(t_U) q(Y)} \leq \log \int_{t_U, Y} p(t_U, Y | X, t_L),$$

where q(Y) is assumed to be a Gaussian distribution and $q(t_U)$ is a discrete joint distribution over the unobserved labels. The approximate inference algorithm aims to compute good approximations q(Y) and $q(t_U)$ to the real posteriors by iteratively optimizing the above described variational bound. Specifically, given the approximations $q^k(y) \sim N(M^k, \Sigma^k)$ and $q^k(t_U)$ from the $k^{th}$ iteration the update rules are as follows:

$$q^{k+1}(Y) \propto p(Y|X) \phi(Y_L, t_L) \phi(Y_U, q^k(t_U))$$

$$q^{k+1}(t_U) \propto \Psi + \Psi - \phi(M_U^k, t_U)$$

For clarity, this discussion offers a collection of the product of unary potential terms in $\phi$ and the labeled instantiation of local potentials, match and non-match constraints in $\psi+$ and $\psi-$ respectively. The first update equation considers the current beliefs about the unlabeled data and incorporates it in updating q(Y). Notice that the first update equation is just a product of Gaussian terms and can be computed easily:

$$q^{k+1}(Y) \sim N(M^{k+1}, \Sigma^{k+1})$$

Where: $M^{k+1} + K(K + \sigma^2 I)^{-1} \begin{bmatrix} \bar{t}_L \\ q^{k+1}(t_U) \end{bmatrix}$ $$\Sigma^{k+1} = K - K(K + \sigma^2 I)^{-1} K$$

Again $\bar{t}_L$ denotes the indicator matrix where everything is zero except the (i,j) entry is set to 1 if $x_i$ is labeled as class j. This update operation is potentially the same as inferring Y by considering distributions over unlabeled data in addition to the labeled images.

The second update equation similarly considers the local potentials $\phi(m_U^k, t_U)$ induced by the posterior $q^k(Y)$ over the latent variables and desire to resolve the pairwise constraints in order to compute the updated distribution over $t_U$. Notice that the second update equation for $q^{k+1}(t_U)$ has the same form as a Markov Random Field. In particular $\psi+$ and $\psi-$ are the edge potentials while $\phi(M^k, t_U)$ are the local potentials. Consequently, the techniques can use loopy belief propagation to first compute the marginal probabilities $q^{BP}(t_i)$ for all $i \in U$ and set $$q^{k+1}(t_U) = \prod_{i \in U} q^{BP}(t_i).$$

Note that in the presence of cycles in the graph doing loopy belief propagation until convergence can provide approximations for the marginal distributions. The pseudocode for the message passing scheme is provided in Algorithm 1.

Algorithm 1—Inferring the Unknown Labels
function probOut=Infer(K, $\bar{t}_L$, $\epsilon+$, $\epsilon-$)
Compute A=K(K+$\sigma^2$I)$^{-1}$
Initialize:
$q^0(t_U)$=0 and $q^0(Y)$=N(M$^0$, $\Sigma^0$)
where M$^0$=A[$t_L$; $q^0(t_U)$] and $\Sigma^0$=K−AK
for k=0 to Maximum Iterations or Convergence do
Update $q(t_U)$:
   Do Loopy BP over MRF induced by $\epsilon+$, $\epsilon-$ and $$\phi q^{k+1}(t_U) = \prod_{i \in U} q^{BP}(t_i)$$

Update q(Y):
M$^{k+1}$=A[$\bar{t}_L$; $q^{k+1}(t_U)$]
end for
Return probOut=$q(t_U)$ Alternating between the above described updates can be considered as message passing between a classifier and a constraint resolution scheme. By doing the update on $q(t_U)$, the constraints are imposed on classification results and are resolved by performing belief propagation. Similarly, by updating q(Y) any new information learned about the unlabeled points is propagated to the classifier in order to update its class beliefs. By iterating between these two updates the model consolidates information from both components, and thus provides a good approximation of the true posterior.

The computational complexity of the first update step is $O(N^3)$ due to the inversion of the N×N matrix, here N is the total number of data points. However, note that the particular term $K(K+\sigma^2 I)^{-1}$ may be computed once and can be reused in every iteration. Inference using loopy belief propagation is the dominating factor in the computational complexity for the second update equation. However, these constraint graphs are often sparse, consequently inference can be run fairly efficiently for most of the real-world photo collections.

Use in an Active Learning Criterion

One task in active learning is to seek the label for one of the unlabeled examples and then update the classification model by incorporating it into the existing training set. A goal is to select the sample that would increase (and/or potentially maximize) the benefit in terms of the discriminatory capability of the system.

One heuristic with non-probabilistic classification schemes is to first establish the confidence of the estimates using the distance from the classification boundary (margin) and select the closest to the margin. However, this Bayesian model provides a full posterior distribution over the class labels for the unlabeled points which can be used for active learning. As in standard active learning methods, measures such as uncertainty or information gain can be used.

Formally, these two selection criteria can be written as:

$$\text{UN: } x^* = \underset{i \in U}{\operatorname{argmax}} H(t_i)$$

$$\text{INFO: } x^* = \underset{i \in U}{\operatorname{argmax}} H(t_U \setminus i) - E_{t_i}[H(t_U \setminus i | t_i)]$$

Here, $H(.) = -\Sigma_{c \in classes} p_c \log(p_c)$ where $p_c = q^{BP}(t_i = c)$ in this model, denotes Shannon entropy and is a measure of uncertainty. The uncertainty criterion seeks to select the face image with most uncertainty, whereas the information gain criterion seeks to select a data point that has the highest expected reduction in uncertainty over all the other unlabeled points. Either of these criterion can be computed given the inferred posteriors; however it is worth noting that the information gain criterion is far more expensive to compute as it entails repeated inference by considering all possible labels for each unlabeled data point. The uncertainty criterion on the other hand is very simple and often guides active learning with reasonable amount of gains. This discussion considers uncertainty as the primary active learning criterion, although please note that extension to other information theoretic schemes is possible.

In summary, the above described algorithms can guide the user to tag faces in an improved (and/or potentially best) possible order during a context-driven face recognition assisted tagging scenario. In particular, the active learning paradigm can be extended to take advantage of constraints known a priori. For example, in the context of personal photo collections, if two faces come from the same source photograph, then they are most likely of different people. Similarly, in the context of video, the present implementations can consider that faces from a single track are highly likely to be of the same person. Given a set of unlabeled images and constraints, the current techniques can use a probabilistic discriminative model that models the posterior distributions by propagating label information using a message passing scheme. The uncertainty estimate provided by the model naturally allows for active learning paradigms where the user is consulted after each iteration to tag additional faces. Experiments show that performing active learning while incorporating a priori constraints provides a significant boost in many real-world face recognition tasks.

First Method Example

Figure 8:
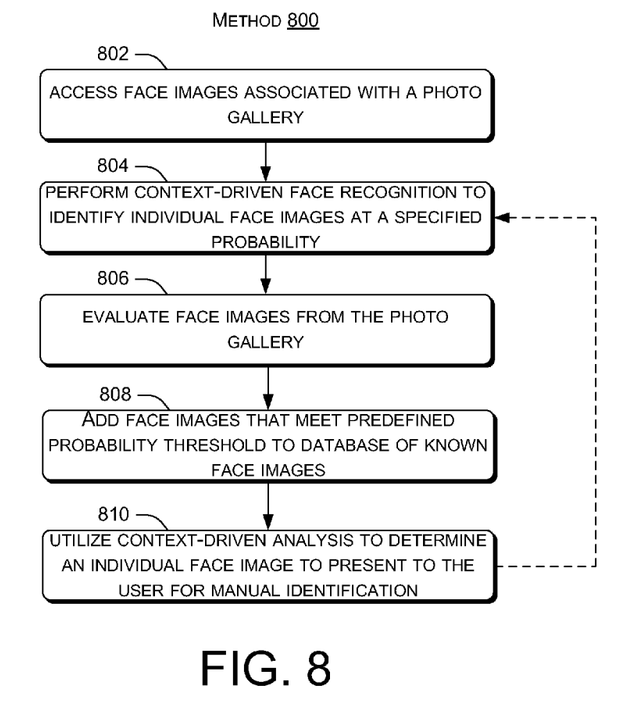
FIG. 8 is a flowchart of a context-driven assisted face recognition tagging method that can be accomplished in accordance with some implementations of the present concepts.

FIG. 8 shows a flowchart of an assisted face recognition tagging method or technique 800 that is consistent with at least some implementations of the present concepts. The order in which the method 800 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

At block 802 the method can access face images associated with a photo gallery. In a basic sense, a photo gallery can simply be thought of as a set of photos. An example of a photo gallery is described above relative to FIG. 1. In some implementations, the accessing can entail locating the face images of the photo gallery. In other implementations, the face images may be pre-located so that accessing entails obtaining the pre-identified face images.

At block 804 the method can perform context-driven face recognition to identify individual face images at a specified probability. Examples of context-drive face recognition techniques are described above relative to FIGS. 2-4 and 7. In some implementations, the accessing of block 802 can be thought of as a sub-set of the block 804. For instance, the method can evaluate photos to identify face images and can assign identities and probabilities to the face images in a context-driven manner. In other implementations, face images may have been located at block 802 in a separate process. Block 804 can then serve to identify the located face images and specify or assign probabilities in a context-driven manner.

Performing context-driven face recognition on individual face images can serve to evaluate contextual relationships between pairs of face images and/or between the face image(s) and the photo(s). For instance, the process can consider whether an individual face image occurs on the same photo as another face image. Another example of the context of the individual face images is whether another face image occurs on another photo that was taken by the same camera at a small change in time from the photo that the individual face image is on. If so, the context-driven identifying can consider the relative location of the face images on the two photos as a further context.

At block 806 the method can evaluate face images from the photo gallery. In some cases, the evaluation can compare the specified probabilities to a predefined probability threshold. This comparison can be utilized at block 808.

At block 808 the method can add face images that meet a predefined probability threshold to a database of known face images. For instance, the predefined threshold value can be set at 0.9 probability, for example. Face images that have been identified by the user would have a probability of 1.0 and as such would automatically qualify for addition to the database of known face images. Other face images may be identified with a high enough degree of certainty (i.e., specified probability) without user identification. For instance, this can be especially likely for consecutive "burst mode" photos or video. More and more face images tend to meet the predefined threshold as the process is repeated as will be described below. An example of a database of known face images is described above relative to FIGS. 2-4.

At block 810 the method can utilize context-driven analysis to determine an individual face image to present to the user for manual identification. One implementation can consider tagging each face image in the photo gallery and can calculate a total (i.e., gallery-wide) reduction in uncertainty associated with asking the user to tag individual face images. This implementation can then pick the face image to present to the user that offers the greatest reduction in uncertainty for the gallery as a whole. Another implementation can select the face image that offers a relatively high context-driven information gain of any face image of the gallery.

In some implementations, block 810 can determine a single individual face image to present to the user for manual identification. In other implementations, block 810 can determine multiple individual face images to present to the user for manual identification. The multiple selected individual images could be presented to the user simultaneously, such as on a single user-interface, or consecutively.

At this point, the method can return to block 804 and repeat context-driven face recognition. Now, the database of known face images can be utilized as context-related training data that can affect the identified probabilities of remaining face images. For instance, if a user identifies one face image on a photo as a specific person, then the probability that others face images on that photo are that same person are likely going to change (i.e., decrease). Blocks 804-810 can be repeated until all of the images of the photo gallery are added to the database of known face images.

It should also be noted that for most users, a photo gallery is not a static item. Instead the user can set up the photo gallery with an initial set of photos (e.g. a first folder) and then can subsequently add more photos (e.g., a second folder or a sub-folder of the first folder). The present implementations may be even more performant as the photo gallery and database of known face images grow such that further additions of photos may be tagged with little or no user effort based upon context-driven assisted face recognition tagging.

CONCLUSION

Although techniques, methods, devices, systems, etc., pertaining to context-driven assisted face recognition tagging are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A hardware computer-readable storage media having instructions stored thereon that when executed by a computing device cause the computing device to perform acts, the acts comprising:
    accessing a plurality of face images associated with a photo gallery comprising a plurality of photos, wherein a first photo from the plurality of photos comprises a first face image and a second face image from the plurality of face images;
    performing context-driven face recognition to identify individual face images at specified probabilities, the specified probabilities including a first specified probability that the first face image in the first photo is a specific person and a second specified probability that the second face image in the first photo is the specific person;
    receiving, from a user, an indication that the first face image in the first photo is the specific person; and
    responsive to receiving the indication from the user, decreasing the second specified probability that the second face image in the first photo is the specific person.

2. The hardware computer-readable storage media of claim 1, the acts further comprising:
    for a second photo comprising a third face image and a fourth face image:
        before receiving the indication from the user:
            identifying a third specified probability that the third face image in the second photo is the specific person, and
            identifying a fourth specified probability that the second face image in the first photo is the specific person, and
        responsive to receiving the indication from the user:
            increasing the third specified probability that the third face image in the second photo is the specific person, and
            decreasing the fourth specified probability that the second face image in the first photo is the specific person.

3. The hardware computer-readable storage media of claim 1, further comprising adding, to a database of known images, individual face images for which the specified probabilities satisfy a predefined threshold.

4. The hardware computer-readable storage media of claim 1, wherein the accessing comprises accessing individual face images from a new folder of the photo gallery and face recognition information relating to other individual face images in existing folders of the photo gallery and wherein the other individual face images in the existing folders are used as training data for identifying the individual face images in the new folder.

5. The hardware computer-readable storage media of claim 1, the acts further comprising:
    responsive to receiving the indication from the user, changing a third specified probability that a third face image in a second photo is the specific person.

6. The hardware computer-readable storage media of claim 5, the acts further comprising:
    after changing the third specified probability:
        comparing the third specified probability for a third face image to a threshold, and
        when the third specified probability meets the threshold, adding the third face image to a database of known face images to indicate that the third face image is the specific person.

7. The hardware computer-readable storage media of claim 1, the acts further comprising:
    determining another face image to present to the user for manual identification based at least partly on the decreased second specified probability.

8. A system comprising the hardware computer-readable storage media of claim 1 and the computing device.

9. A method comprising:
    accessing face images associated with a photo gallery comprising a plurality of photos;
    performing context-driven face recognition to identify individual face images at specified probabilities in the plurality of photos, the specified probabilities including a first specified probability that a first face image in a first photo from the plurality of photos is a specific person;
    receiving, from a user, an indication that the first face image in the first photo is the specific person; and
    responsive to receiving the indication from the user:
        adding the first face image to a database of known face images to identify the first face image as the specific person, and
        for a second photo from the plurality of photos that was taken in close temporal sequence with the first photo, increasing a second specified probability that a second face image in a second photo is the specific person when the first face image and the second face image appear in approximately the same region of the first photo and the second photo, wherein at least the increasing the second specified probability is performed by a hardware processor.

10. The method according to claim 9, further comprising:

determining another face image to present to the user for manual identification based at least partly on the increased second specified probability.

11. The method according to claim 9, further comprising encoding similarity of face regions of the first face image and the second face image.

12. The method according to claim 9, wherein the first photo and the second photo are obtained together via a burst mode of a camera.

13. A hardware computer-readable storage media having instructions stored thereon that when executed by the hardware processor cause the hardware processor to perform the method of claim 9.

14. A system comprising the hardware computer-readable storage media of claim 13 and the hardware processor.

15. A method comprising:

accessing face images included in a plurality of frames of a video recording;

performing context-driven face recognition to identify individual face images at specified probabilities in the plurality of frames, the specified probabilities including a first specified probability that a first face image in a first frame from the plurality of the frames is a specific person;

receiving an indication from a user that the first face image in the first frame is the specific person; and responsive to receiving the indication from the user:

adding the first face image to a database of known face images to identify the first face image as the specific person, and for a second frame from the plurality of frames, increasing a second specified probability that a second face image in the second frame is the specific person when the first face image and the second face image appear in approximately the same region of the first frame and the second frame, wherein at least the increasing the second specified probability is performed by a hardware processor.

16. The method of claim 15, wherein the first frame and the second frame are consecutive frames.

17. The method of claim 16, wherein the first frame and the second frame are temporally separated by approximately $\frac{1}{30}$ of a second.

18. The method according to claim 15, further comprising determining whether the first frame and the second frame are in a single track.

19. A hardware computer-readable storage media having instructions stored thereon that when executed by the hardware processor cause the hardware processor to perform the method of claim 15.

20. A system comprising the hardware computer-readable storage media of claim 19 and the hardware processor.

\* \* \* \* \*